United States Patent [19]  
Toyoda

[11] Patent Number: 5,048,623  
[45] Date of Patent: Sep. 17, 1991

[54] COMBINATION WEIGHING APPARATUS  
[75] Inventor: Yoshiharu Toyoda, Akashi, Japan  
[73] Assignee: Yamato Scale Company, Limited, Akashi, Japan  
[21] Appl. No.: 505,764  
[22] Filed: Apr. 6, 1990  
[30] Foreign Application Priority Data  
  Apr. 7, 1989 [JP] Japan .................................. 1-89391  
[51] Int. Cl.⁵ ............................................ G01G 13/16  
[52] U.S. Cl. .................................... 177/25.18; 177/59  
[58] Field of Search ............................... 177/25.18, 59  
[56] References Cited  
U.S. PATENT DOCUMENTS  
4,418,771 12/1983 Henry et al. ............................ 177/1  
4,446,938 5/1984 Kawanishi ........................ 177/25.18  
4,454,924 6/1984 Minamida ............................. 177/25  
4,627,504 12/1986 Moran ......................... 177/25.18 X Primary Examiner—George H. Miller, Jr.  
Attorney, Agent, or Firm—Senniger, Powers, Leavitt & Roedel

[57] ABSTRACT  
A combination weighing apparatus having weighing buckets to weigh masses of material and subsequently transfer them to auxiliary buckets for temporary storage, the masses in the weighing buckets and/or auxiliary buckets being selected in combination processing and then discharged to forming a batch of predetermined weight, the apparatus comprising: a first detecting means detecting a timing to open outlet gates of the weighing bucket to transfer the mass to the auxiliary buckets; a timer means sequentially measuring, based on the timing, such an additional time length needed to completely transfer the mass remaining in the weighing bucket into the auxiliary bucket; a second detecting means detecting a further timing to open outlet gates of the auxiliary buckets to discharge the mass selected in the combination processing; and a setting means setting, based on the further timing, duration of said outlet gate's opened state of the auxiliary bucket, the duration being given by adding the additional time length to such a further time length needed to completely discharge the mass from the auxiliary buckets. The second detecting means and the setting means may be replaced by a deciding means making a decision as to whether or not the mass transferred to the auxiliary bucket is subject to selection, based the remaining time length measured by the timer means is or is not zero, the remaining time length being given by subtracting a combination-computing time from an ordinary time length necessary for the mass in the weighing bucket to be completely transferred to the auxiliary bucket.

12 Claims, 15 Drawing Sheets

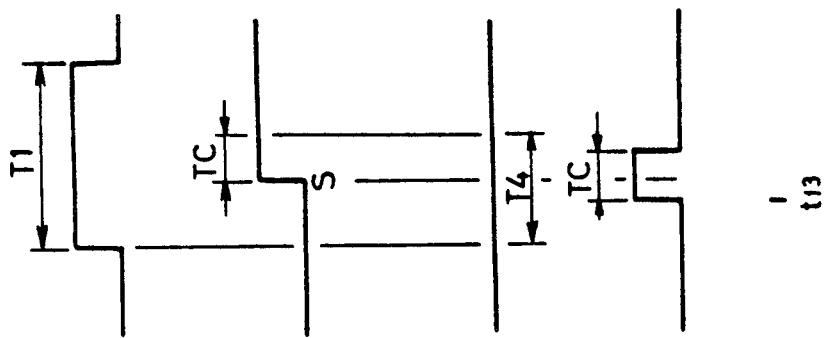
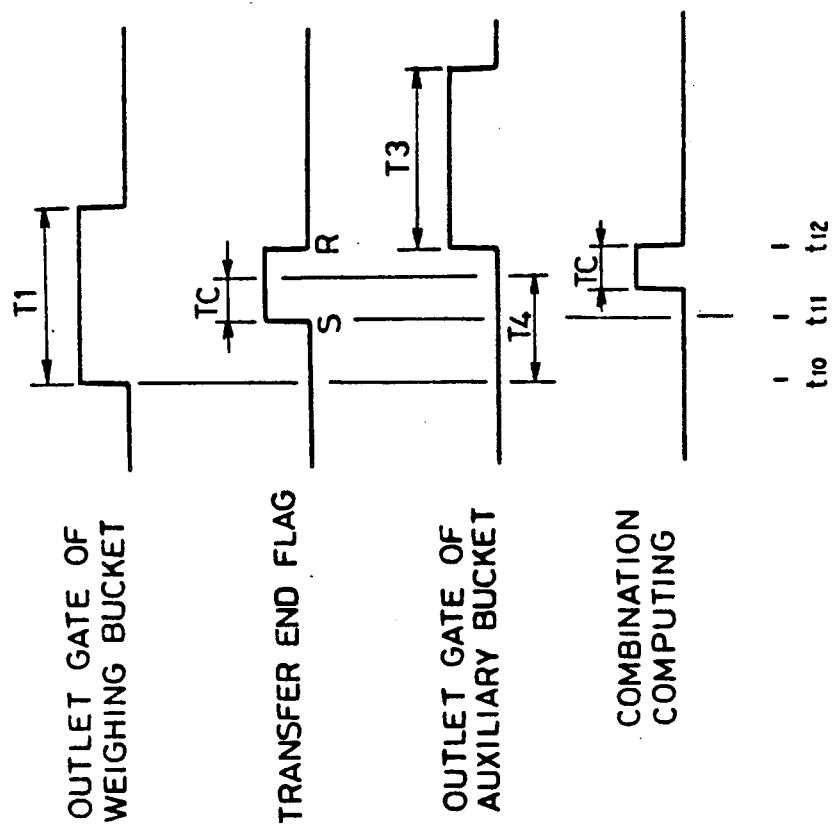

COMBINATION WEIGHING APPARATUS

BACKGROUND OF THE INVENTION

The present invention relates to a combination weighing apparatus, and more particularly to a combination weighing apparatus which is provided with a control system to improve accuracy in combination processing.

There are known combination weighing apparatuses of two types I and II as described below.

Type I: The combination weighing apparatus of this type comprises a plurality of receptacle sets each consisting of one weighing bucket "WB" and one auxiliary bucket "MB", as shown in FIG. 15. The weighing bucket "WB" weighs a mass of material which is transported thereto and then transfers the weighed mass to the auxiliary bucket "MB", the weighed mas being temporarily held therein. Such masses of material which are weighed and contained in said weighing bucket and auxiliary bucket are subject ot selection which is made in combination processing to give a batch of predetermined weight. Selected weighing buckets "WB" and auxiliary buckets "MB" have to discharge their contents.

Type II: The combination weighing apparatus of this type comprises a plurality of receptacle sets each consisting of one weighing bucket "WB" and two auxiliary buckets "MB", as shown in FIG. 16. The weighing bucket "WB" weighs a mass of material which is transported thereto and then transfers the weighed mass to either auxiliary bucket "MB" which is selected, the weighed masses being temporarily held in the auxiliary buckets. Such masses of material which are weighed and contained in said auxiliary buckets are subject to selection which is made in combination processing to give a batch of predetermined weight. Selected auxiliary buckets "MB" have to discharge their contents.

FIGS. 17a and 17b respectively illustrate two possible modes of operation in the known combination weighing apparatuses described above. In one of the operation modes shown in FIG. 17a, a mass of material which was previously weighed by the weighing bucket "WB" and transported therefrom to either auxiliary bucket "MB" so as to be temporarily stored therein will be discharged therefrom at a time when a command is given to the auxiliary bucket as a result of combination processing, after the mass has become stable in said auxiliary bucket. In the other operation mode shown in FIG. 17b, such a command to discharge a mass of material stored temporarily in the auxiliary bucket "MB" is given thereto as a result of the combination processing, before said mass has not completely been transferred to said auxiliary bucket. The outlet gate of the weighing bucket "WB" is opened to transfer the contents thereof to the auxiliary bucket "MB" in such a manner as illustrated in FIGS. 17a and 17b. The outlet gate of the auxiliary bucket "MB" is also opened to discharge its content in a manner as illustrated in said FIGS. 17a and 17b, reference symbols "$T_x$" and "$T_y$" ($T_x < T_y$) written thereon respectively denoting periods of time during which the outlet gates of the weighing bucket and auxiliary bucket are kept open to transfer or discharge their contents.

It will be apparent that in the prior art the known apparatuses need the period of time "$T_y$" was lengthened to excess in order to completely discharge the weighed and temporarily stored mass without failure in any cases because there was a high probability that said mass would be discharged by the combination processing before it has been completely transferred to the auxiliary bucket "MB".

Such an excessively long period of time employed for the purpose of safety is, of course, apt to prolong each weighing cycle time "$T_o$" which consists of the following periods of time "$T_a$", "$T_b$", "$T_c$" and "$T_d$".

The period of time "$T_a$" is the calculation period needed to select the masses of materials during the above-mentioned combination processing. The other period of time "$T_b$" ($=$"$T_y$") is the discharging period during which the outlet gate of the auxiliary bucket "MB" remains open for discharging its content. The further period of time "$T_c$" is the transferring period during which the outlet gate of the weighing bucket "WB" remains open to transfer the mass of material therefrom to the auxiliary bucket "MB". The still further period of time "$T_d$" is the stabilizing period during which the mass of material is charged into the weighing bucket "WB" and subsequently the state of said mass becomes stable therein.

Comparison of FIG. 17a with FIG. 17b will make more apparent the abovedescribed problem. The period "$T_x$" will suffice as such discharging period "$T_b$" for keeping open the auxiliary bucket's outlet gate in the case shown in FIG. 17a, but instead, a longer period "$T_y$" shown in FIG. 17b will be employed therefor in the known apparatuses. This results in the weighing cycle time "$T_o$" which is unnecessarily made long so that the number of weighed masses of material which can be selected in the combination processing will inevitably decrease as a whole, thereby making it difficult to improve the accuracy and efficiency of the combination processing.

SUMMARY OF THE INVENTION

It is therefore an object of the invention to provide a combination weighing apparatus which is free from the afforedescribed problems.

In accordance with a first embodiment of the invention, the combination weighing apparatus which is schematically shown in FIG. 1 is so constructed that weighing buckets are adapted to weigh masses of material and subsequently transfer them to respective auxiliary buckets for temporary storage, the masses weighed and subsequently stored in the weighing buckets and/or auxiliary buckets are subject to selection in combination processing so as to be combined into a batch of predetermined weight, and the selected weighing buckets and/or auxiliary buckets discharge said masses stored therein, the weighing apparatus comprising: (a) a first detecting means (1) for detecting a timing to open an outlet gate of each weighing bucket so as to transfer the weighed mass stored therein to the corresponding auxiliary bucket or buckets; (b) a timer means (2) for sequentially measuring, in course of time and based on the timing detected by the first detecting means (1), such an additional length of time that is needed to completely transfer the mass remaining in the weighing bucket into the auxiliary bucket; (c) a second detecting means (3) for detecting a further timing to open an outlet gate of each auxiliary bucket so as to discharge the mass which has been temporarily stored therein and is selected in the combination processing; and (d) a setting means (4) for setting, based on the further timing detected by the second detecting means (3), duration of an opened state of said outlet gate of the auxiliary bucket wherein the duration is calculated by adding the additional length of time measured by the timer means (2) to such a further length of time that is needed to completely discharge the mass from the auxiliary bucket.

In accordance with a second embodiment of the invention, the combination weighing apparatus which is schematically shown in FIG. 2 is so constructed that weighing buckets are adapted to weigh masses of material and subsequently transfer them to respective auxiliary buckets for temporary storage, the masses weighed and subsequently stored in the weighing buckets and/or auxiliary buckets are subject to selection in combination processing so as to be combined into a batch of predetermined weight, and then the selected weighing buckets and/or auxiliary buckets discharge said masses stored therein, the weighing apparatus comprising: (a) a detecting means (11) for detecting a timing to open an gate of each weighing bucket so as to transfer the weighed mass stored therein to the corresponding auxiliary bucket or buckets; (b) a timer means (12) for sequentially measuring, in course of time and based on the timing detected by the detecting means (11), a remaining length of time drawing to an end of a predetermined shortened length of time which is given by subtracting a combination-computing time in the combination processing from such an ordinary length of time that is needed to completely transfer the mass remaining in the weighing bucket into the auxiliary bucket; and (c) a deciding means (13) for making a decision as to whether or not the mass of material which has been transferred to the auxiliary bucket is subject to selection in the combination processing, the decision being made by judging whether the remaining length of time which is measured by the timer means (12) is or is not zero.

In the first embodiment, the first detecting means (1) detects an instant when the weighing bucket starts to transfer the mass to the auxiliary bucket. The timer means (2) starts to continuously measure the additional length of time needed to completely transfer said mass to the auxiliary bucket, if and when said instant is detected by the first detecting means. The second detecting means (3) detects a further instant when said auxiliary bucket starts to discharge the mass. The setting means (4) will subsequently start to determine the duration of the opened state of the outlet gate for completely discharging said mass from the auxiliary bucket, if and when the further instant is detected by the second detecting means (2). The duration of the opened outlet of auxiliary bucket is a sum of the additional time length measured by the timer means (2) and such an ordinary length of time that is ordinarily needed, in a case where the mass has been thoroughly received already by said auxiliary bucket, to completely discharge said mass therefrom.

In the second embodiment, the detecting means (11) detects an instant when the weighing bucket starts to transfer the mass to the auxiliary bucket. The timer means (12) starts to sequentially measure, if and when the instant is detected by the detecting means, the remaining time in a predetermined shortened time period given by subtracting the combination-computing time from the ordinary time length needed to completely transfer the mass remaining in the weighing bucket into the auxiliary bucket. The mass which is judged by the deciding means (13) to have a remaining time greater than zero is not made subject to the selection in said combination-processing.

It will now be apparent that in the first embodiment the duration of the opened state of the auxiliary bucket is not always fixed to be excessively long for safety purpose as in the known apparatuses but is set variable to be different for the different buckets discharging the masses. It also will be apparent that in the second embodiment the duration of the opened state of the auxiliary bucket is made significantly shorter than in the known apparatuses, because the discharging of mass from any auxiliary bucket is inhibited if the transferring of the mass to the relevant auxiliary bucket would not be completed within a given shortened period of time. As a result, the weighing cycle time in both the first and second embodiments becomes shorter than that in the prior art apparatuses. This improves the efficiency of weighing operation and increases the number of masses as a whole which can be subject to selection in the combination processing, thus enhancing the accuracy in weight of the batches each comprising the combined or merged masses of material.

Further in the second embodiment, variations in time lengths for the masses to flow through a collecting chute will decrease compared with that in the prior art apparatuses, because the duration of the opened state of the auxiliary buckets is not varied but fixed among those buckets in this embodiment.

BRIEF DESCRIPTION OF THE DRAWINGS

The present invention will become more apparent from the following description made referring to the drawings, in which:

FIGS. 3 to 11 illustrate the combination weighing apparatus of the first embodiment, wherein;

FIG. 3 shows the apparatus in outline;

FIG. 4 is a block diagram of a control mechanism employed in the apparatus;

FIG. 5 illustrates software used to control the apparatus;

FIG. 6 is a time chart showing an operation of the software;

FIGS. 7 to 11 are flowcharts of programs or tasks "TSK2" to "TSK6" executed by a microcomputer incorporated in the control mechanism; and FIGS. 12 to 14 illustrate the combination weighing apparatus in the second embodiment, wherein;

FIGS. 12 and 14 are flowcharts of programs or tasks "TSK4" and "TSK5" executed by a microcomputer incorporated in a control mechanism employed in the second embodiment; and FIGS. 13a and 13b are time charts of the operation of software used to control the apparatus in the second embodiment; and FIGS. 15 to 18 are schematic diagrams illustrating the known combination weighing apparatuses, wherein;

FIGS. 15 and 16 show relationships between weighing and auxiliary buckets;

FIG. 18 shows a weighing cycle in the known apparatuses.

DETAILED DESCRIPTION OF THE PREFERRED EMBODIMENTS

First Embodiment

Figure 1:
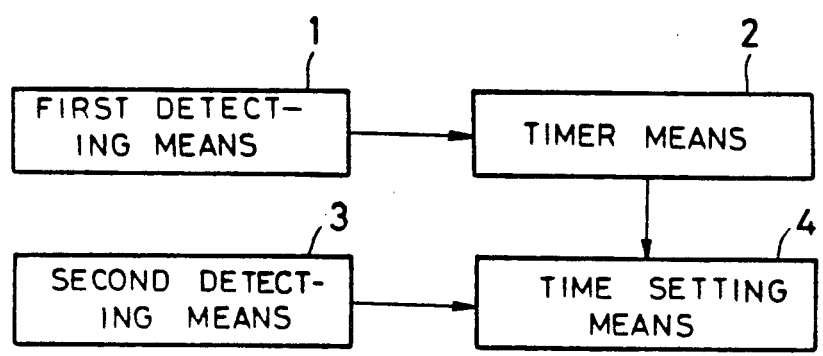
FIGS. 1 and 2 are schematic diagrams showing features of combination weighing apparatuses of the first and second embodiments respectively.
Figure 2:
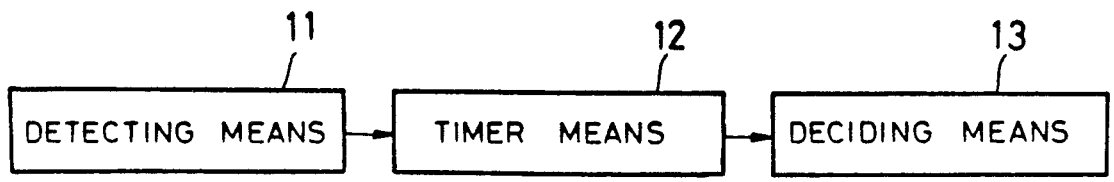
Figure 3:
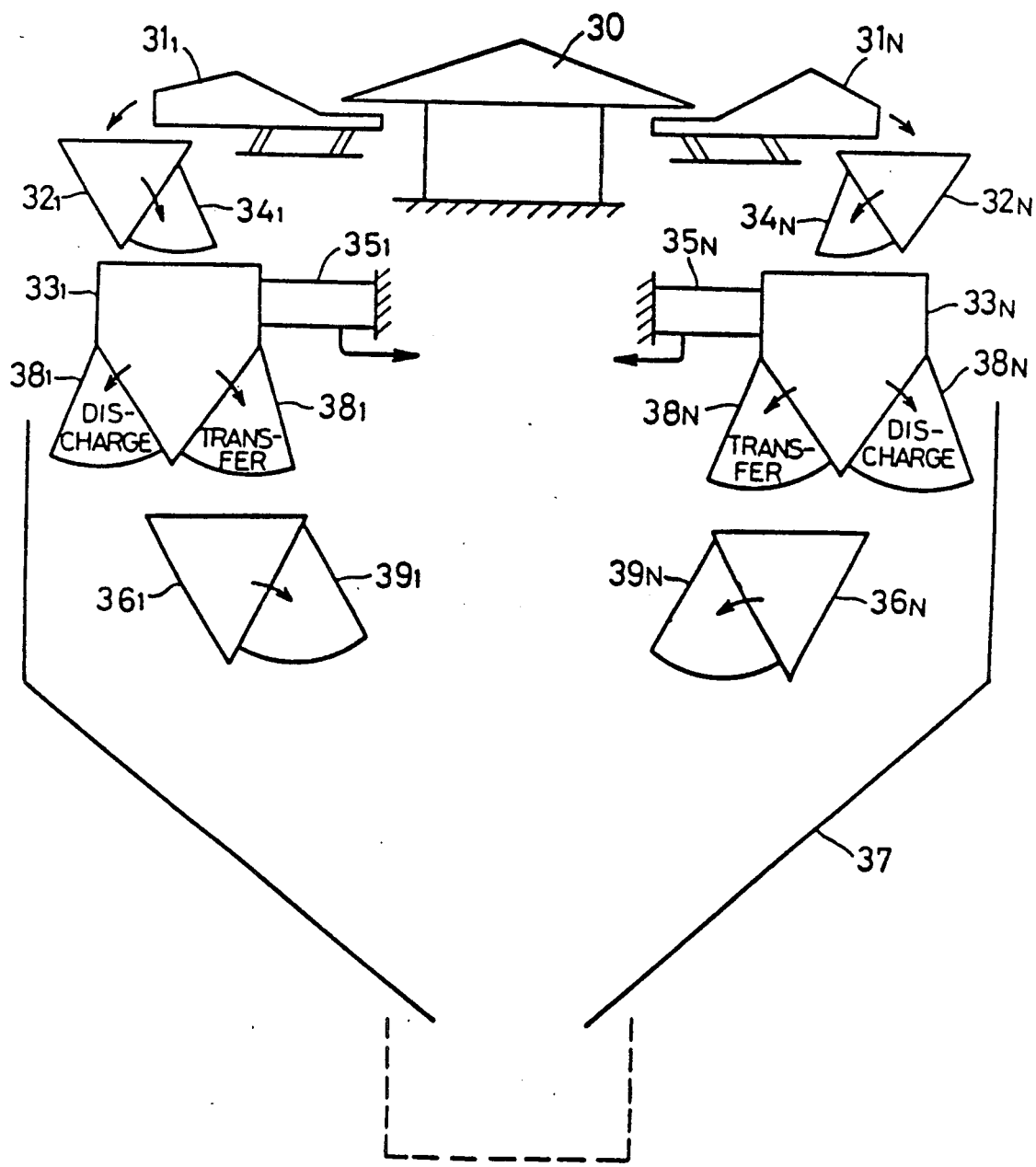

Referring to FIG. 3, there are shown a distributing device 30 and "N" sets of feeders $31_1$ to $31_N$ which are disposed around the device and along the periphery thereof. There are feeding buckets $32_1$ to $32_N$ respectively disposed under the corresponding feeders $31_1$ to $31_N$. Lumps, clods or masses of material to be weighed are delivered to the feeding buckets $32_1$ to $32_N$, through the corresponding feeders $31_1$ to $31_N$, respectively.

Weighing buckets $33_1$ to $33_N$ are respectively disposed below the corresponding feeders $31_1$ to $31_N$. Said masses which have been delivered to the feeding buckets are then fed to the weighing buckets $33_1$ to $33_N$, through corresponding outlet gates $34_1$ to $34_N$ which are provided on the feeding buckets $32_1$ to $32_N$.

The weighing buckets $33_1$ to $33_N$ are each provided with one of measuring devices $35_1$ to $35_N$ which comprise load cells or the like adapted to weigh said masses fed to said weighing buckets $33_1$ to $33_N$. Auxiliary buckets $36_1$ to $36_N$ are respectively disposed under the corresponding weighing buckets, in a one-to-one relation. A collecting chute 37 is located below all of the weighing buckets and all of the auxiliary buckets. The masses which have been weighed in the weighing buckets $33_1$ to $33_N$ are either transferred to the auxiliary buckets $36_1$ to $36_N$ or discharged directly into the collecting chute 37, according to the states of the two outlet gates i.e., a transfer gate and a discharge gate) $38_1$ to $38_N$ provided on each weighing bucket. On the other hand, the masses which have been stored temporarily in the auxiliary buckets $36_1$ to $36_N$ will also be discharged into said collecting chute 37 when outlet gates $39_1$ to $39_N$ respectively of said auxiliary buckets are opened.

A packing device (not shown) also is provided under the collecting chute 37 so as to pack the masses collected in said chute and discharged therethrough.

Figure 4:
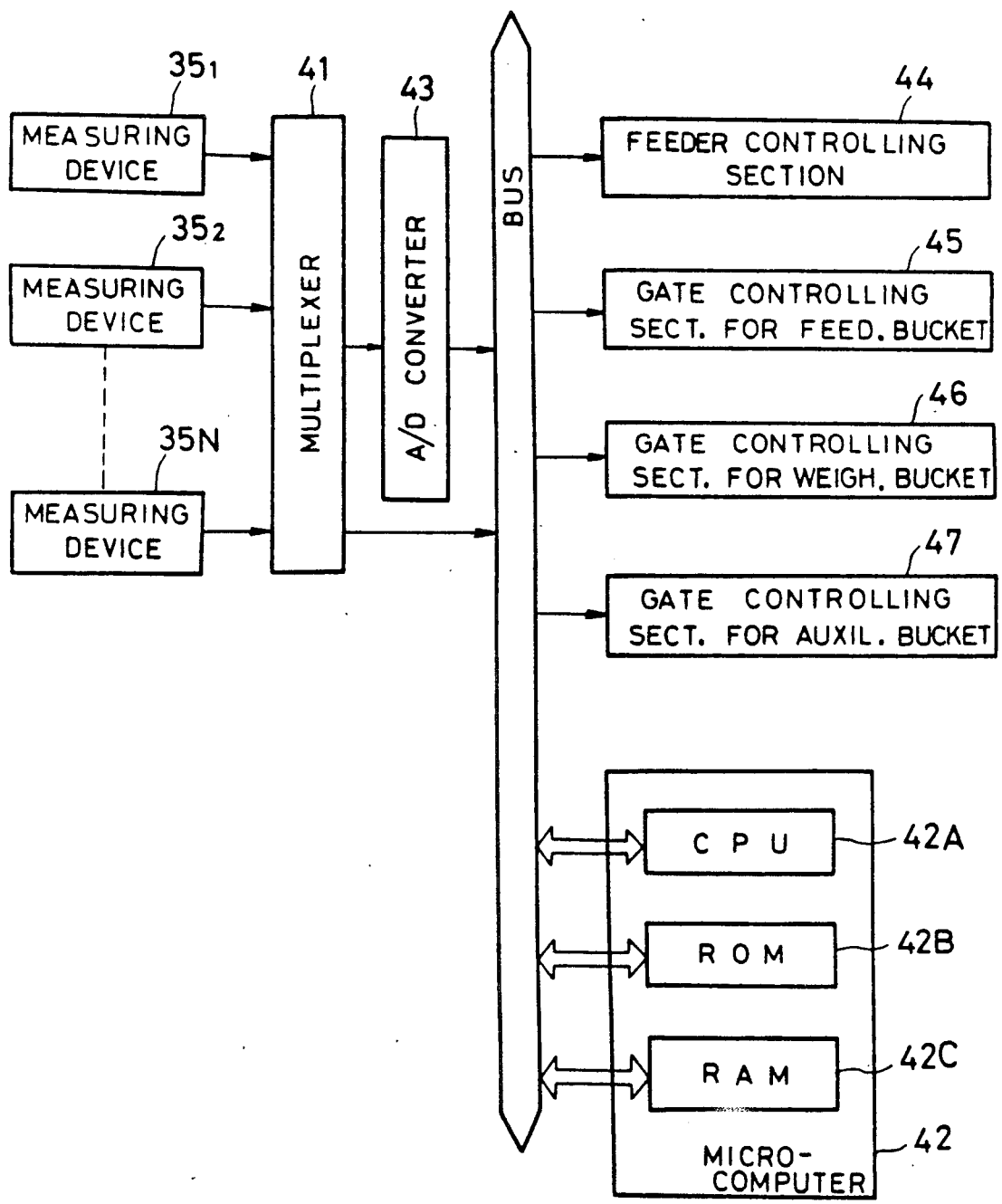

Now, reference is made to FIG. 4 showing a control mechanism for the combination weighing apparatus of the first embodiment. A multiplexer 41 shown therein is adapted to receive analog weight data which are produced by weighing the masses by means of the measuring devices $35_1$ to $35_N$. These analog weight data are sequentially converted into digitized weight data by an analog-to-digital converter 43, under control of microcomputer 42. The microcomputer 42 comprises a central processing unit (CPU) 42A which is adapted to execute given programs. A read-only memory (ROM) 42B in the microcomputer stores the given programs, and a random-access memory (RAM) 42C in said microcomputer 42 is utilized as a working memory necessary to execute said programs and comprises areas for registers allotted to the weight data or other data.

The control mechanism comprises a feeder controlling section 44, a gate controlling section 45 for the feeding buckets, a further gate controlling section 46 for the weighing buckets and a still further gate controlling section 47 for the auxiliary buckets. The abovementioned programs are executed to give commands to these controlling sections. The feeder controlling section 44 controls the feeders $31_1$ to $31_N$ to deliver the masses of material to the feeding buckets $32_1$ to $32_N$. The gate controlling section 45 opens or closes the outlet gates $34_1$ to $34_N$ to control delivery of said masses to the weighing buckets $33_1$ to $33_N$ from the feeding buckets $32_1$ to $32_N$. The further gate controlling section 46 opens or closes the outlet gates $38_1$ to $38_N$ so as to control transfer of said masses to the auxiliary buckets $36_1$ to $36_N$ or discharge of said masses directly to the collecting chute 37, both from the weighing buckets $33_1$ to $33_N$. The still further gate controlling section 47 also opens or closes the outlet gates $39_1$ to $39_N$ to control discharge of the said masses to the chute 37 from the auxiliary buckets $36_1$ to $36_N$.

Commands are given by the microcomputer 42 to these controlling sections 44 to 47 so that the feeders $31_1$ to $31_N$, the outlet gates $34_1$ to $34_N$, $38_1$ to $38_N$ and $39_1$ to $39_N$ are controlled to supply the chute 37 with a batch of the masses which are selected by the combination processing, the batch being of a predetermined weight and being subsequently packed by the packing device.

Figure 5:
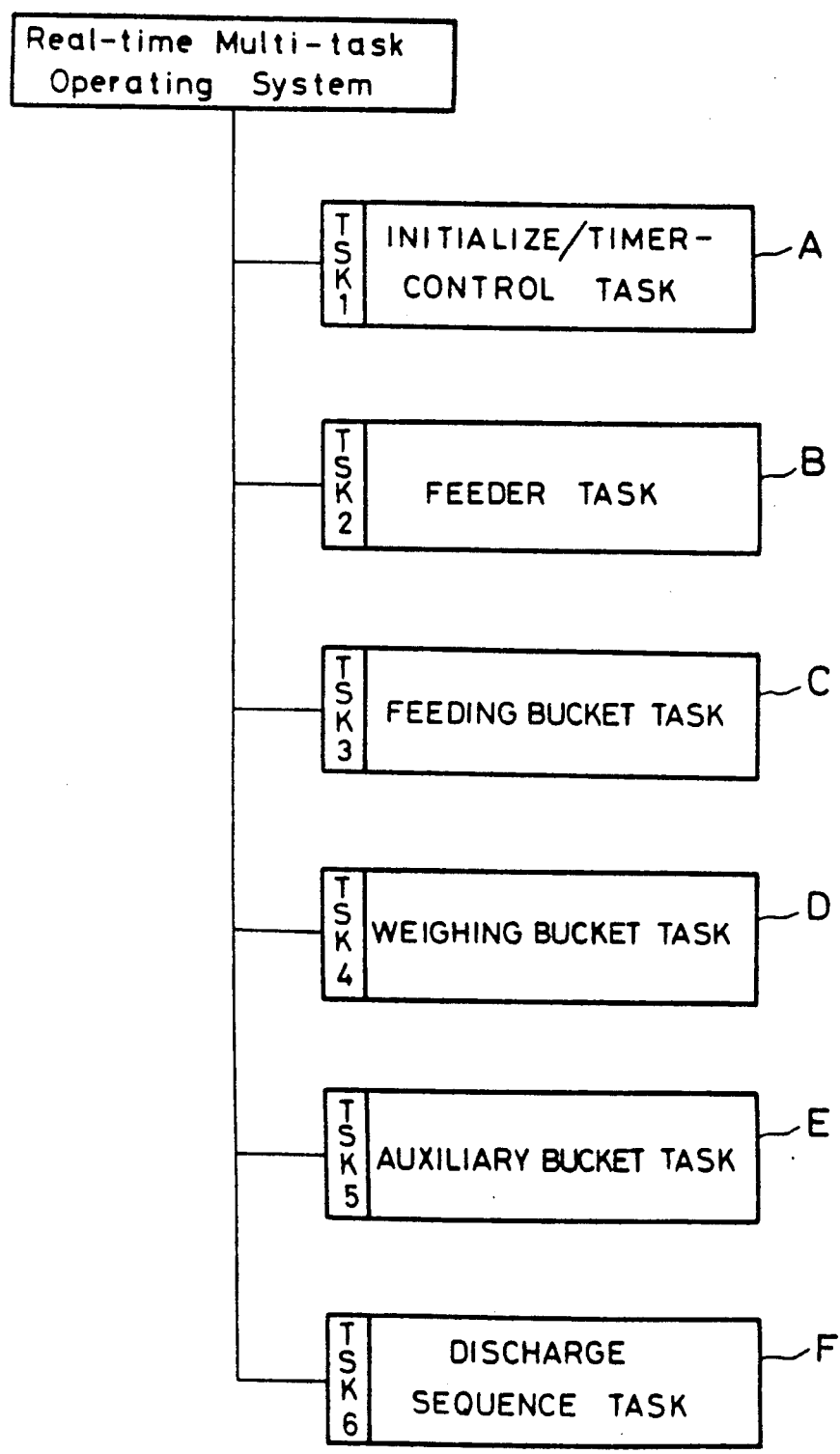

The ROM 42B of the microcomputer stores a Real-time Multi-task Operating System which is shown in FIG. 5 and comprises an initialize/timer-control task "TSK1", a feeder task "TSK2", a feeding bucket task "TSK3", a weighing bucket task "TSK4", an auxiliary bucket task "TSK5" and a discharge sequence task "TSK6", respectively labeled "A", "B", "C", "D", "E" and "F" in FIG. 5.

The initialize/timer-control task "TSK1" ("A") is adapted to initialize, and set initial values to, the registers or the like allotted in the RAM 42C. Further, this task "TSK1" controls the measuring of elapsed time during the execution of the programs.

Figure 6:
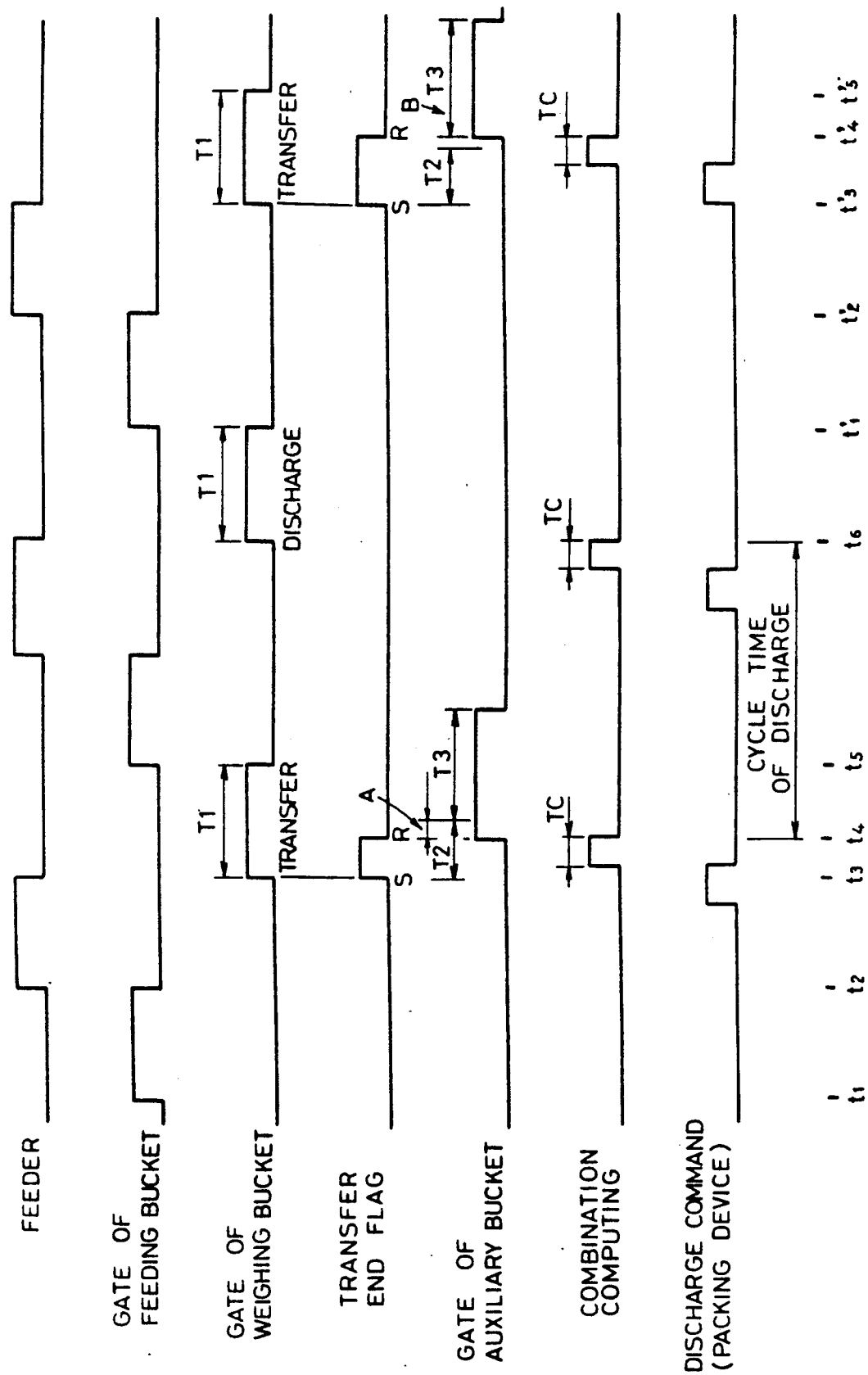

The other tasks "TSK2" to "TSK6" (i.e., "B" to "F") will be described in detail referring to flowcharts shown in FIGS. 7 to 11 and a time chart shown in FIG. 6. For simplicity, only one feeder $31_1$, feeding bucket $32_1$, weighing bucket $33_1$ and auxiliary bucket $36_1$ are described, though there are "N" sets of these feeders and buckets in the weighing apparatus in this embodiment.

I. Feeder Task "TSK2" (shown in FIG. 7 and labeled "B" in FIG. 5)

Step C-5 in the feeding bucket task "TSK3" described below causes this feeder task "TSK2" to start at times $t_2$, $t'_2$... At Step B-1 of this feeder task "TSK2", the feeder $31_1$ is switched on and will continue to run for an operation period of time determined at Step B-2. The feeder is switched off at those times $t_3$, $t'_3$... as shown on the time chart, at Step B-3. Then, this feeder task "TSK2" ends at Step B-4.

II. Feeding bucket Task "TSK3" (shown in FIG. 8 and labeled "C" in FIG. 5)

Step D-12 in the weighing bucket task "TSK4" described below causes this feeding bucket task "TSK3" to start at those times $t_1$, $t'_1$... shown on the time chart. The outlet gate $34_1$ is opened at Step C-1, and subsequently, the weighing bucket task "TSK4" ("D") is caused to start at Step C-2. Step C-3 maintains the outlet gate $34_1$ open for a period of time which is long enough to completely transfer the mass in the feeding bucket $32_1$ to the corresponding weighing bucket $33_1$. Thereafter, the outlet gate $34_1$ is closed at those times $t_2$, $t'_2$... shown on the time chart, at Step C-4. Step C-5 causes the feeder task "TSK2" "B" to start. Finally, this feeding bucket task "TSK3" ends at Step C-6.

III. Weighing bucket Task "TSK4" (shown in FIG. 9 and labeled "D" in FIG. 5)

Step C-2 in the feeding bucket task "TSK3" described above causes this weighing bucket task "TSK4" to start, which comprises Step D-1 determining a period of time to stabilize such weight data that is obtained in respect of the mass in the weighing bucket $33_1$ by means of the measuring device $35_1$. The weight data is read at Step D-2, and a weighing end flag is set at Step D-3.

A decision is made at Step D-4 as to whether or not the auxiliary bucket $36_1$ which has to receive the weighed mass from the weighing bucket $33_1$ is empty. If no, then a further decision is made at Step D-5 on whether there is or is not an event of discharge command for this weighing bucket $33_1$, the command being transmitted at Step F-8 of the discharge sequence task "TSK6" described hereinafter. If no at the further decision, then the current process returns to Step D-4 after a pause for 10 (ten) milliseconds at Step D-6.

If the auxiliary bucket $36_1$ is decided, at those times $t_3$, $t'_3$..., to be empty by the decision made at Step D-4, then the outlet (transfer) gate $38_1$ is opened at Step D-7 so as to transfer the weighed mass in the weighing bucket $33_1$ to said auxiliary bucket $36_1$. Then, an event signal indicating the opening of the transfer gate $38_1$ is transmitted at Step D-8. The weighing end flag is reset and a transfer end flag is set at Step D-9. Thereafter, Step D-10 causes the transfer gate $38_1$ to remain opened for such a period of time $T_1$ that is necessary for the mass in the weighing bucket $33_1$ to be completely transferred to the auxiliary bucket $36_1$. Said transfer gate $38_1$ will be closed at those times $t_5$, $t'_5$... which are shown in the time chart, at Step D-11.

After the feeding bucket task "TSK3" has been started at Step D-12, the current weighing bucket task "TSK4" ends at Step D-13.

On the other hand, in the event that discharge is decided by the further decision made at Step D-5, then the outlet (discharge) gate $38_1$ is opened at such times as $t_6$ shown on the time chart. The opening of this gate $38_1$ permits the mass in the weighing bucket $33_1$ to enter the collecting chute 37. After resetting the weighing end flag at Step D-15, the discharge gate $38_1$ is maintained open for the period of time T1 at Step D-16, which period is the same period as that referred to at Step D-10 but also is a period long enough to completely discharge the mass in said weighing bucket $33_1$. After this period has elapsed, the discharge gate $38_1$ is closed at Step D-17.

IV. Auxiliary bucket Task "TSK5" (shown in FIG. 10 and labeled "E" in FIG. 5)

At Step E-1, a decision is made as to whether there is or is not the event signal to open the transfer gate $38_1$, the event signal being transmitted at Step D-8 of the weighing bucket task "TSK4". If not, then the process returns to Step E-1 after a pause for 10 (ten) milliseconds at Step E-2. If yes, then a period of time T2 is set to the timer "TM" as the period "tm" at Step E-3 at the time $t_3$, $t'_3$... in the time chart, the period of time T2 being such that the weighed mass is completely transferred to the auxiliary bucket $36_1$ from the corresponding weighing bucket $33_1$. The timer TM counts of elapsed time from the period "tm" each time a clock pulse is transmitted (which occurs at regular intervals of 10 (ten) milliseconds), during operation of the Realtime Multi-task Operating System.

At Step E-4, a further decision is made as to whether there is or is not an event signal of a command to discharge the mass from this auxiliary bucket $36_1$, the event signal being transmitted at Step F-8 in the discharge sequence task "TSK6" described later. If not, then the process goes to Step E-2. If yes, then the transfer end flag is reset at Step E-5 at the times $t_4$, $t'_4$... as shown on the time chart. Next, the outlet gate $39_1$ of the auxiliary bucket $36_1$ is opened at to Step E-6 so as to discharge the mass therein into the chute 37. The opened state of said gate $39_1$ is maintained for a summed length of time "tm" + T3 at Step E-7, "tm" being given by the timer "TM" as the time required for the weighed mass remaining in the weighing bucket $33_1$ at that instant to be completely transferred to the auxiliary bucket $36_1$, whereas T3 is an ordinary length of time for the completely transferred mass to be thoroughly discharged from said auxiliary bucket $36_1$. After the summed time length "tm" + T3 is over, the outlet gate $39_1$ is closed at Step E-8 and the process returns to Step E-1.

V. Discharge Sequence Task "TSK6" (shown in FIG. 11 and labeled "F" in FIG. 5)

At Step F-1, a first decision is made on whether a total number "n" of the buckets subject to selection in the combination processing and including the weighing buckets $33_1$ to $33_N$ and the auxiliary buckets $36_1$ to $36_N$ is or is not higher than a predetermined number "N", the former buckets having the weighing end flag and the latter buckets having the transfer end flag. If not, then the process returns to Step F-1 after a pause for 10 (ten) milliseconds at Step F-2. If yes, a combination is computed at Step F-3 to select adequate masses or buckets among those subject to selection. Subsequently at Step F-4, a second decision is made on whether the selected masses in the selected buckets do or do not amount to a total weight which falls within an allowable range of weight. If not, a processing to eliminate such an abnormality is done at Step F-5, and the process advances to Step F-9 described below. If yes, then a third decision is made at Step F-6 as to whether there is or is not a command to discharge said selected masses, which command will be previously given by, for instance, the packing device. If not at this third decision, the process returns to Step F-6 after a pause for 10 (ten) milliseconds at Step F-7.

If, on the contrary, there is a command to discharge at Step F-6, then an event signal is transmitted at the time $t_4$, $t'_4$... at Step F-8 so as to discharge the selected masses in the selected buckets to the chute. A pause is made at Step F-9 for a period of time which is determined by subtracting a time length "TC" for computing combination from a discharge cycle time (i.e., weighing cycle time) before the process returns to step F-1.

The first embodiment described above is characterized by the auxiliary bucket task "TSK5" ("E"), and especially by the Step E-7 which defines the duration of the opened state of the auxiliary bucket's outlet gates $39_1$ to $39_N$ in a case wherein the discharge command is given before the transfer of weighed masses from the weighing bucket $33_1$ to $33_N$ to the auxiliary buckets $36_1$ to $36_N$ has finished. In summary, the time length allotted to the complete discharge of weighed masses from said auxiliary buckets $36_1$ to $36_N$ is prolonged as shown by the arrow "A" in FIG. 6 in such a manner that the time length T3 is added to the time "tm" which the timer "TM" is currently indicating as the remaining length of time for completing the transfer of said weighed mass to said auxiliary bucket. Thus, the allotted time length becomes "tm" + T3 wherein T3 is a normal or ordinary time length necessary for the completely transferred mass in the auxiliary bucket to be subsequently discharged completely to the chute. However, if the discharge command is given after completion of said transfer to said auxiliary bucket $36_1$ to $36_N$ as is shown by the arrow "B" in FIG. 6, the remaining time indicated by the timer "TM" is already zero at the instant t4 so that the duration of opened state of the outlet gates $39_1$ to $39_N$ is set to be the ordinary time length T3.

Second Embodiment

The second embodiment also is directed to improvement of combination accuracy due to a shorter weighing cycle time although the duration of opened state of the auxiliary bucket outlet gates $39_1$ $39_N$ is not fixed but varies as described below. The same reference numerals as those in the first embodiment denote the same components which are not explained here again.

Figure 7:
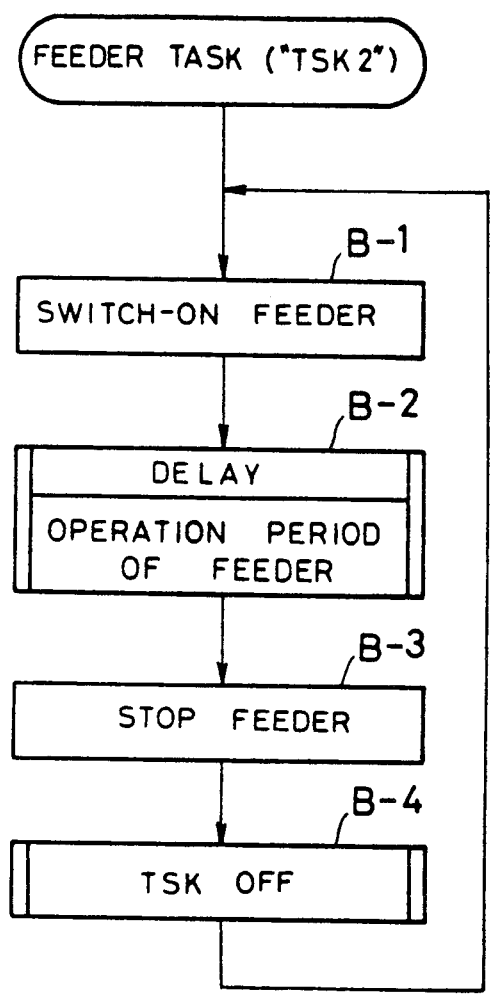
Figure 8:
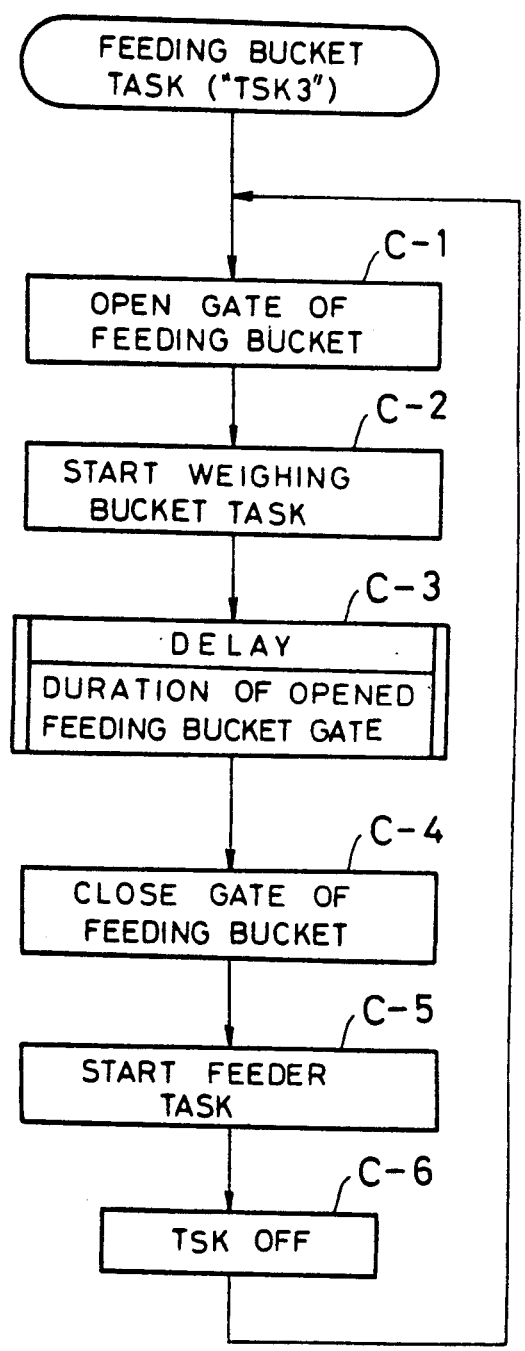
Figure 9:
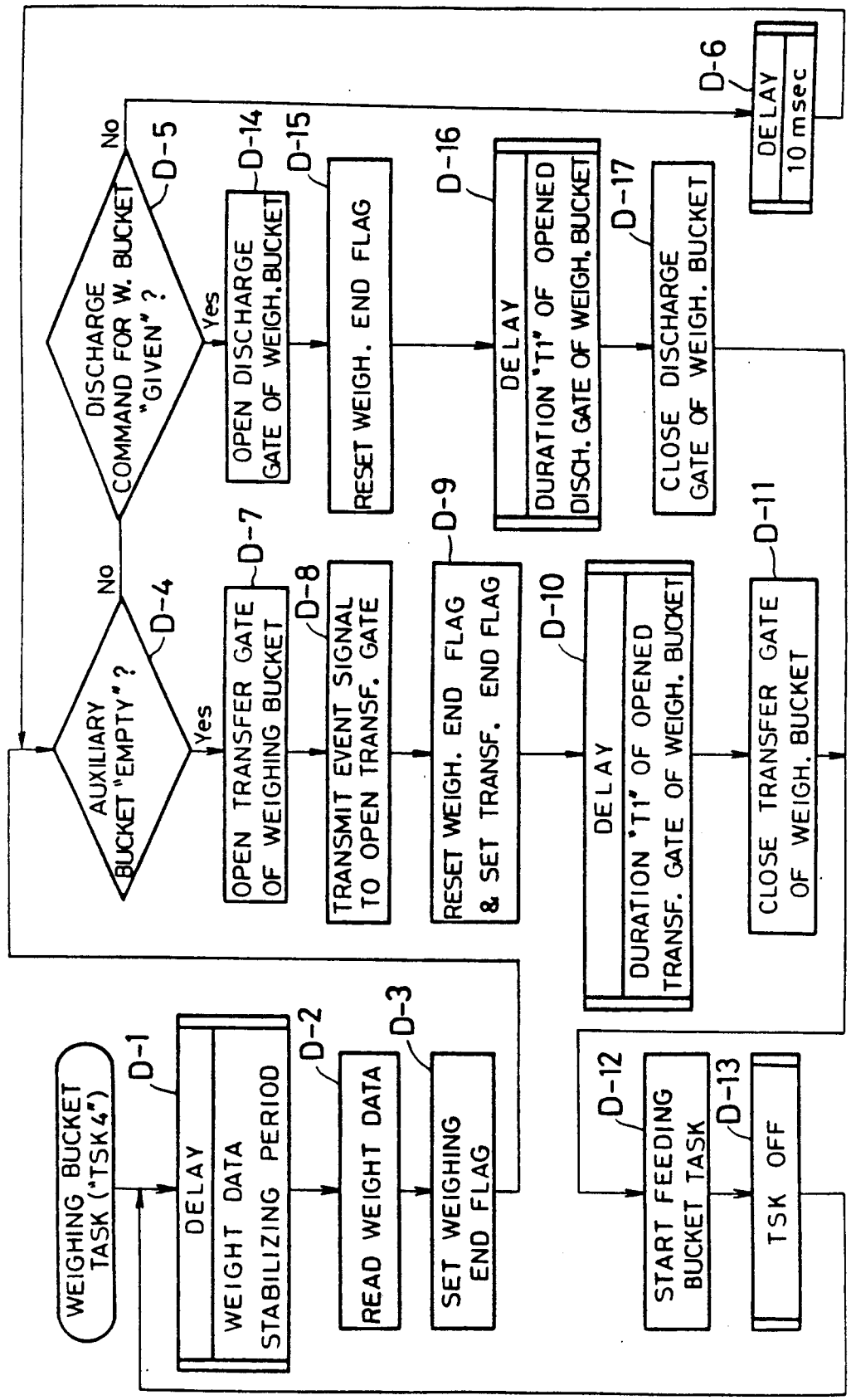
Figure 10:
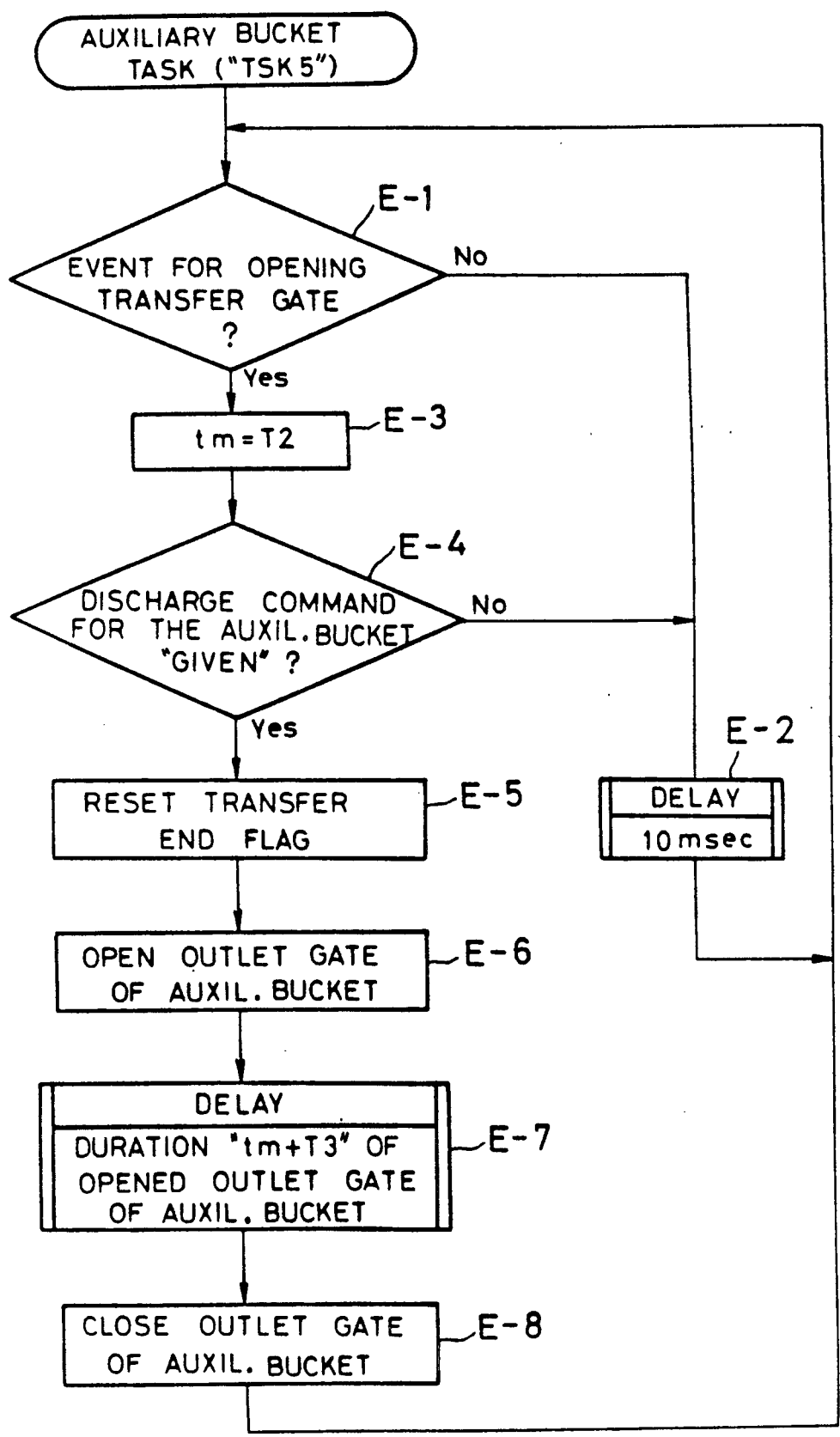
Figure 11:
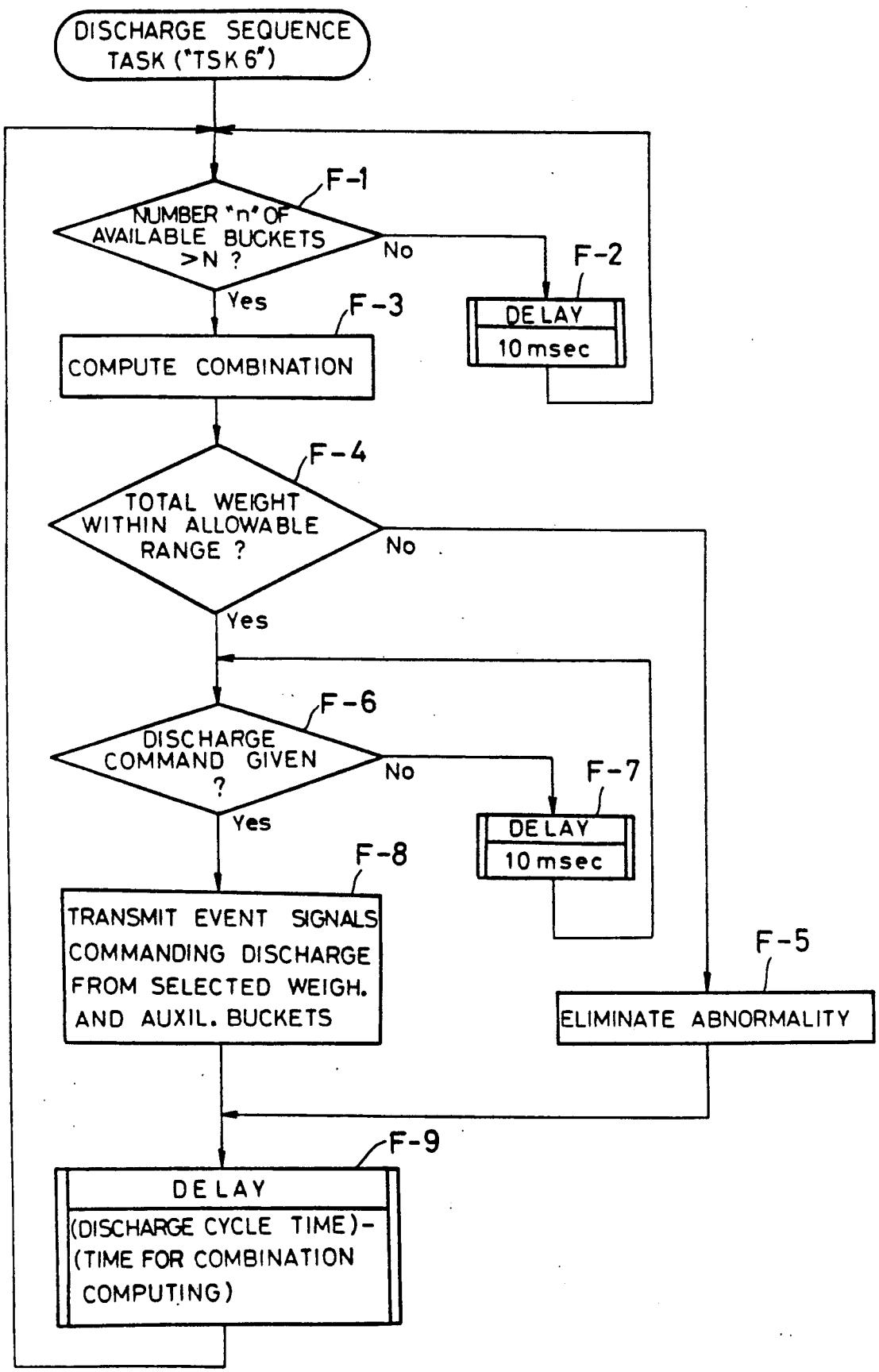

A feeder task "TSK2" (labeled "B"), a feeding bucket task "TSK3" (labeled "C") and a discharge sequence task "TSK6" (labeled "F") are the same as those in the first embodiment and are shown on the flowcharts in FIGS. 7, 8 and 11.

Figure 12:
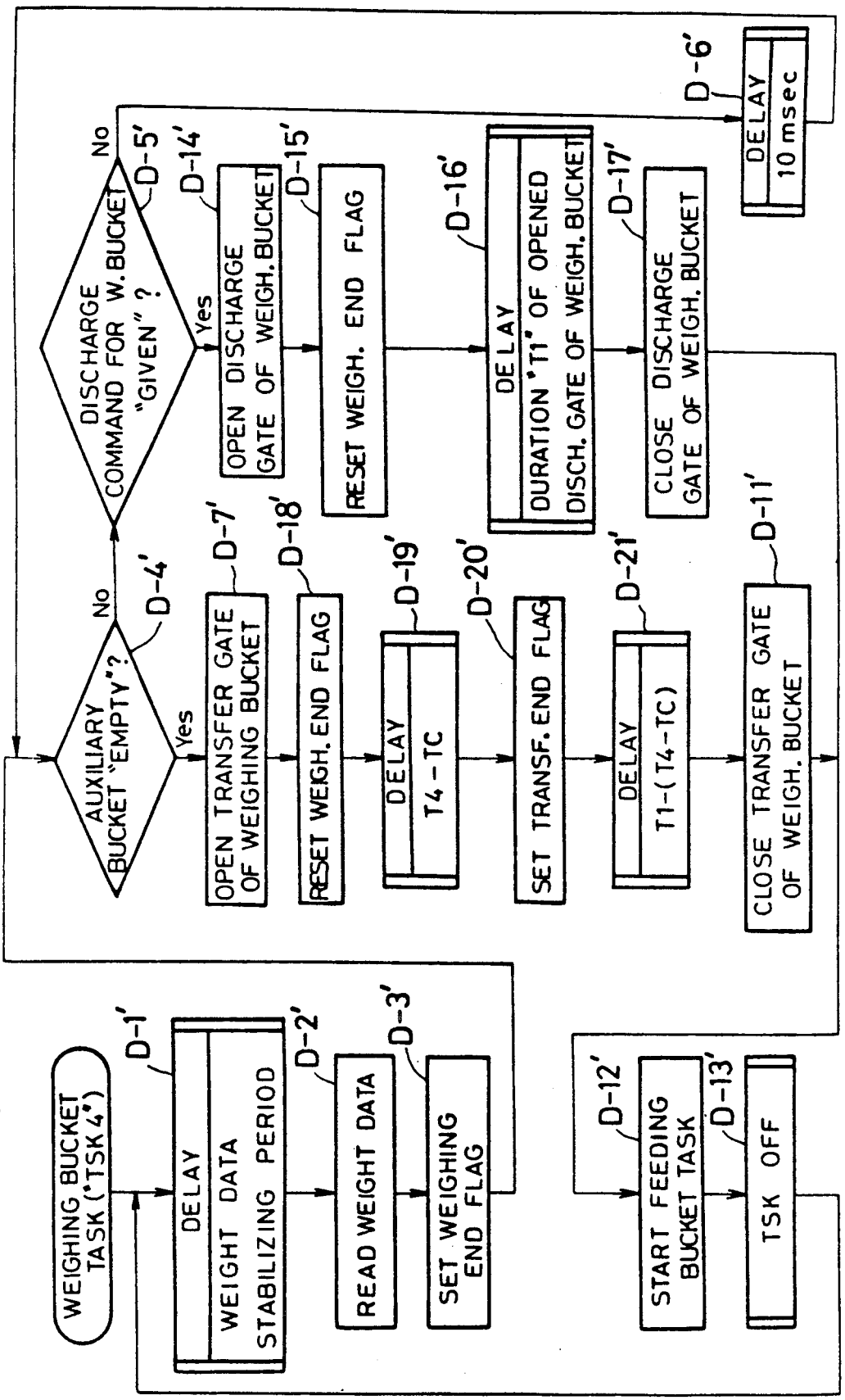

A weighing bucket task "TSK4" (labeled "D'") in the second embodiment is composed as shown by a flowchart in FIG. 12. Its Steps D-1' to D-7' and D-11' to D-17' are the same as those in FIG. 9 which correspond to these Steps. Steps D-18' to D-21' which will be described here referring to time charts in FIGS. 13a and 13b are different from those which are included in the corresponding task in the first embodiment.

If, for instance, at a time $t_{10}$ at Step D-4', it is decided that auxiliary bucket $36_1$ is empty then an outlet (transfer) gate $38_1$ of a weighing bucket $33_1$ is opened at Step D-7' to transfer the weighed mass therein to the auxiliary bucket $36_1$. The weighing end flag is subsequently reset at Step D-18'. Then, a pause for a length of time "T4−TC" is made at Step D-19' before a transfer end flag is set at a time $t_{11}$ at Step D-20', T4 being a time length for the weighed mass to be completely transferred from the weighing bucket $33_1$ to the auxiliary bucket $36_1$, and "TC" being a time length for the computing of combination of the weighed masses (buckets) subject to selection to compose a batch of a given weight. The transfer gate $38_1$ which has been opened at the time $t_{11}$ is thereafter maintained open for a period of time {T1−(T4−TC)} which is the remainder of a given time length T1 from which the time length "T4−TC" has been subtracted as described above, the time length T1 being a predetermined period of time during which said gate $38_1$ is otherwise to be kept open. The gate $38_1$ is closed when the period {T1−(T4−TC)} ends at Step D-11'.

In the event that as shown in FIG. 13a the computing of combinations of the weighed masses (buckets) subject to selection therein would commence, (according to the discharge sequence task) "TSK6" ("F") which operates independently upon this weighing bucket task, after the transfer end flag had been set at the time $t_{11}$, the subject auxiliary bucket $36_1$ and the mass held therein may be subject to the combination to give the batch of the given weight. Thus, transfer of the selected weighed mass from the weighing bucket $33_1$ to the selected auxiliary bucket $36_1$ will have already finished by the time a discharge command is transmitted at a time $t_{12}$.

If, however, the computing of combination commences at a time $t_{13}$ after the transfer of mass from the weighing bucket $33_1$ to the auxiliary bucket $36_1$, but before the transfer end flag is set as illustrated in FIG. 13b, the subject weighed mass and bucket are not subject to selection in the current combination procedure.

Figure 14:
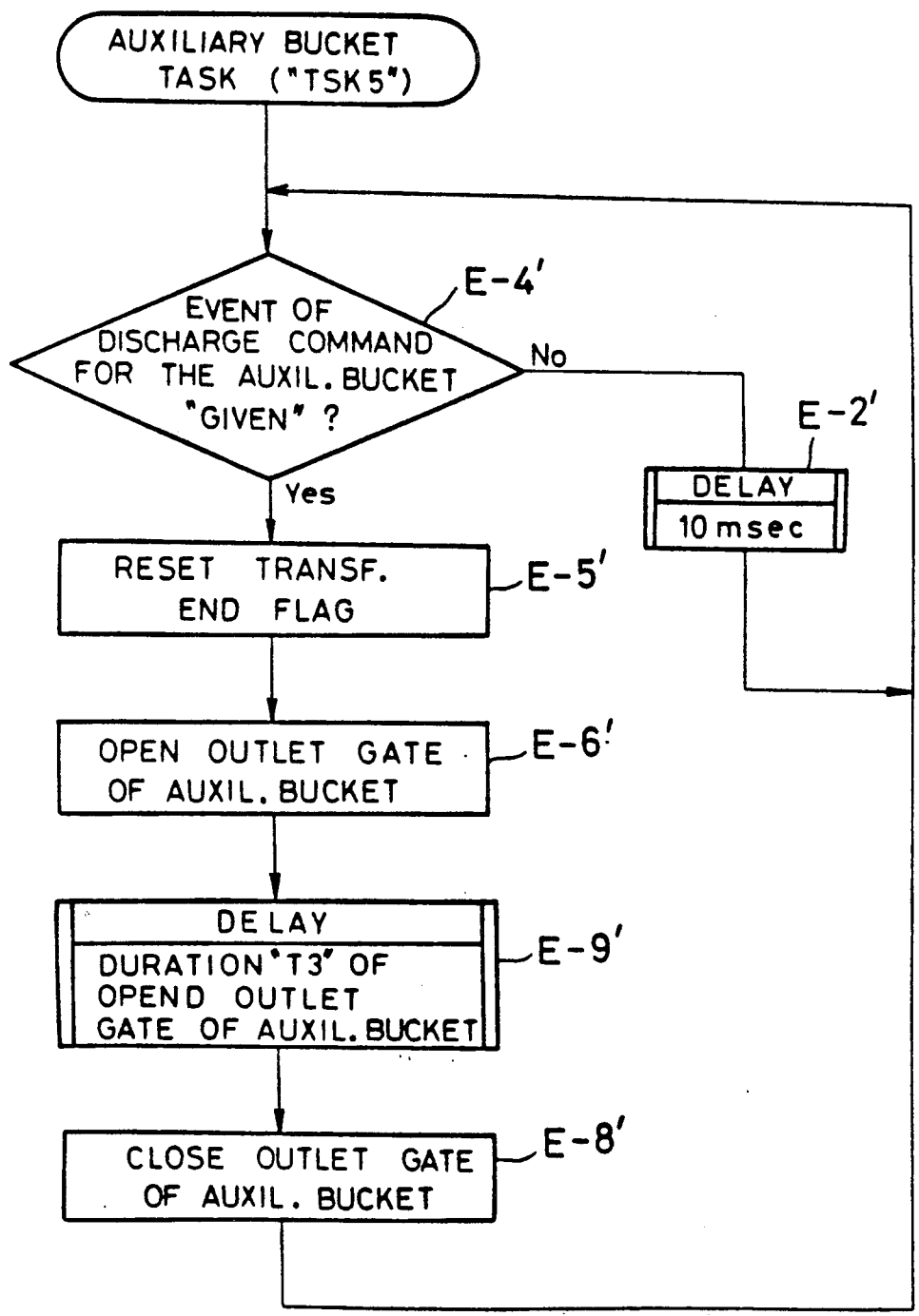
Figure 15:
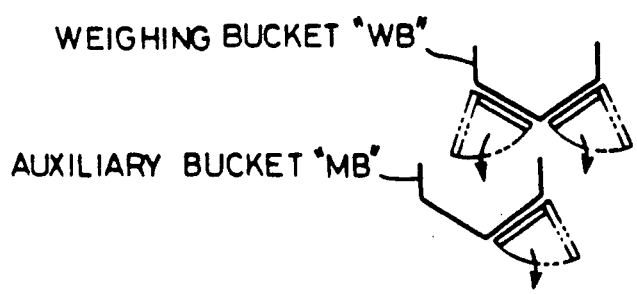
Figure 16:
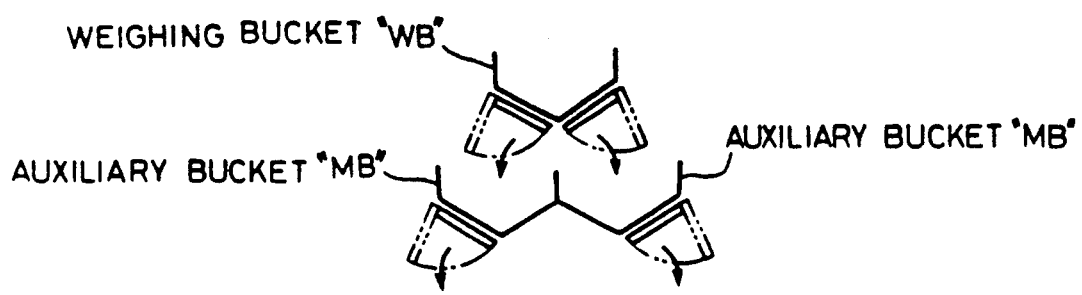
Figure 17B:
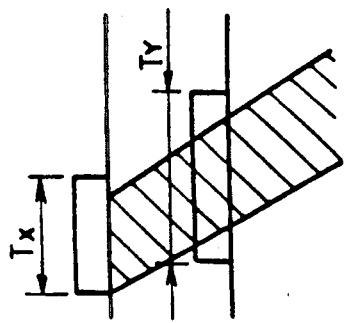
FIGS. 17a and 17b show timings and durations of processes to transfer and discharge weighed mass of material, the timings and durations being determined by the opening of outlet gates of the buckets.
Figure 17A:
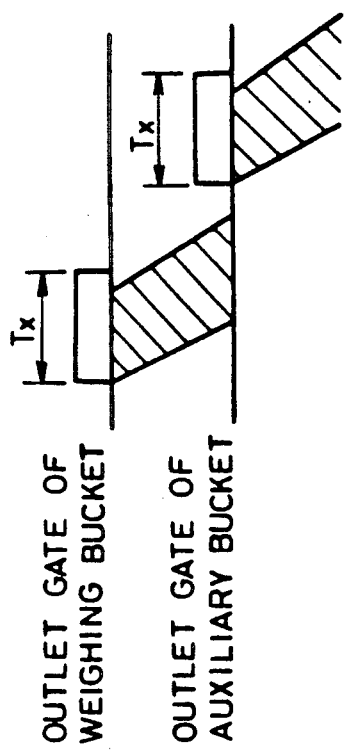
Figure 18:
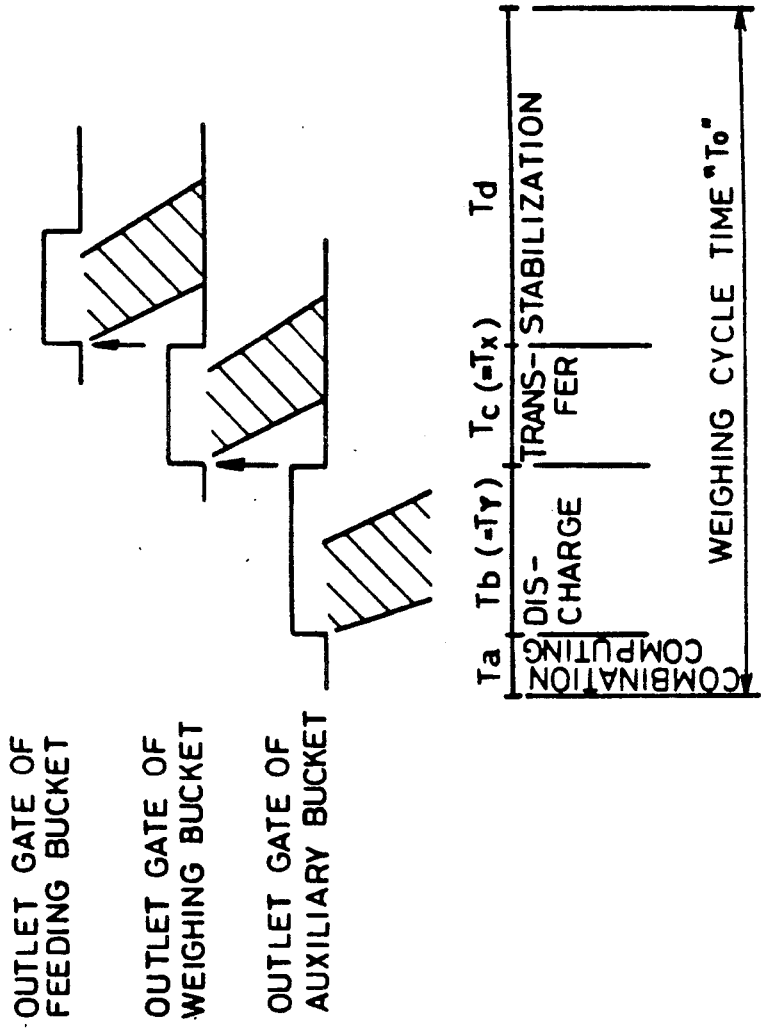

An auxiliary bucket task "TSK5" (labeled "E'") in the second embodiment is composed as shown by a flowchart in FIG. 14. Its Steps E-2', E-4' to E-6' and E-8' are the same as those in FIG. 10 for the first embodiment which correspond to these Steps. Steps E-1 and E-3 are removed from the flowchart shown in FIG. 10 and Step E-9' is added thereto.

At Step E-9', the aforementioned period of time T3 in the first embodiment is applied to an outlet gate $39_1$ so as to keep open this gate for said period of time T3, which as described hereinbefore is the normal or ordinary time length necessary for the completely transferred mass in the auxiliary bucket to be subsequently discharged completely to the chute.

As will be apparent now, the transfer end flag is set in the second embodiment after the pause for the period "T4−TC" at Step D-19' of the weighing bucket task "TSK4" ("D'") in FIG. 12, whereas said flag is set in the known weighing apparatuses at an instant when the transfer of weighed mass of material from the weighing buckets $33_1$ to $33_N$ to the auxiliary buckets $36_1$ to $36_N$ starts. This means that in the present invention the selected mass for which the transfer end flags is set and which is made subject to selection will have already been transferred completely to the subject auxiliary buckets $36_1$ to $36_N$ at an instant when the bucket holding the selected mass therein receives the discharge command. It is to be noted in this connection that in said known apparatuses such an auxiliary bucket $36_1$ to $36_N$ for which the transfer end flag is already set at an instant when the computing of combination starts will be made subject to selection processing whereby discharge from said auxiliary bucket $36_1$ to $36_N$ when the discharge command is received even if transfer of the selected mass thereto had not ended.

Therefore, the duration T3 of opened state of the outlet gate $39_1$ to $39_N$ in the present invention can be fixed at a shorter period as to the auxiliary buckets, compared with that in the known apparatus. The pause for the period "T4−TC" at Step D-19' causes the time length for the computing of combination to be included without failure in a period of time from the setting of transfer end flag to the receiving of discharge command. In other words, the time length "TC" necessary for the computing of combination is taken into account in the previous setting of the transfer end flag.

It will be understood that the forgoing embodiments can also apply to such an apparatus as composed of receptacle sets each comprising one weighing bucket and two auxiliary buckets, though the description was made herein of the sets each comprising one weighing bucket and one auxiliary bucket.

What is claimed is:

1. A combination weighting apparatus which has weighing buckets adapted to weight masses of material and and which can be employed to transfer the weighed masses of material to respective auxiliary buckets for temporary storage, the masses weighed and subsequently stored in the weighing buckets and/or auxiliary buckets being subject to selection in combination processing so as to be combined into a batch of predetermined weight, and then the weighing buckets and/or auxiliary buckets subsequently discharging said selected masses stored therein, the weighing apparatus further comprising:

(a) first detecting means for detecting an open outlet gate of each weighting bucket transferring the weighed mass stored therein to the corresponding auxiliary bucket or buckets;

(b) timer means for indicating, based on the timing of an open outlet gate of a weighing bucket detected by the first detecting means, a remaining period of time that is needed to completely transfer the mass remaining in the weighting bucket into the auxiliary bucket;

(c) second detecting means for detecting an open outlet gate of each auxiliary bucket discharging the mass which has been temporarily stored therein and selected in the combination processing; and (d) setting means for setting, based on the timing of an open outlet gate of an auxiliary bucket detected by the second detecting means, the time that said outlet gate of the auxiliary bucket is open wherein the duration is calculated by adding the remaining period of time measured by the timer means plus the period of time that is needed to completely discharge the mass from the auxiliary bucket, so that if the auxiliary bucket is opened while a mass of material is being transferred to it from a weighing bucket, the auxiliary bucket remains open until the transfer and discharge are complete.

2. A combination weighing apparatus weighing buckets adapted to weigh masses of material and subsequently transfer them to respective auxiliary buckets for temporary storage, the masses weighed and subsequently stored in the weighing buckets and/or auxiliary buckets being subject to selection in combination processing so as to be combined into a batch of predetermined weight, and then the selected weighing buckets and/or auxiliary buckets subsequently discharging said masses stored therein, the weighing apparatus further comprising:

(a) detecting means for detecting an open outlet gate of each weighing bucket transferring the weighed mass stored therein to the corresponding auxiliary bucket or buckets;

(b) means for indicating, based on the timing detected by the detecting means, a remaining period of time that is needed to completely transfer the mass remaining in the weighing bucket to the auxiliary bucket; and (c) determining means for determining whether or not the mass of material which has been tansferred to the auxiliary bucket is subject to selection in the combination processing, said determining means determining that the auxiliary bucket is subject to selection when the combination-computing time in the combination processing is greater than or equal to the remaining period of time thereby excluding from selection such auxiliary buckets which would have remaining mass in their corresponding weighing buckets, which remaining mass would be transferred to such auxiliary buckets after completion of the combination weighing selection.

3. A combination weighing apparatus comprising weighing buckets adapted to weigh masses of material, auxiliary buckets for temporarily storing masses of material transferred from the weighing buckets, combination processing means for selecting a combination of the weighing and auxiliary buckets to form a batch of material of a predetermined weight, and control means for opening the selected weighing and auxiliary buckets to discharge their contents, the control means including:

means for determining the amount of time remaining until the completion of the transfer of a mass of material to an auxiliary bucket from a weighing bucket; and means for setting the period of time that the auxiliary bucket is open approximately equal to the sum of the time normally required to discharge the contents of the auxiliary bucket plus the amount of time indicated by the determining means as remaining until completion of the transfer of the mass of material to the auxiliary bucket from the weighing bucket, so that if the auxiliary bucket is opened while a mass of material is being transferred to it from a weighing bucket the auxiliary bucket remains open until the transfer and discharge are complete.

4. The combination weighing machine, according to claim 3 wherein the determining means includes:

detecting means for detecting when a transfer from a weighing bucket to the auxiliary bucket begins;

timing means, responsive to the detecting means, for measuring the additional time that is needed to complete the transfer to the auxiliary bucket.

5. The combination weighing machine according to claim 4 wherein the setting means includes:

second detecting means for detecting when a discharge from the auxiliary bucket begins;

computing means, responsive to the detecting means, for computing the duration that the auxiliary bucket remains open by adding the period of time required to discharge the contents of the auxiliary bucket and the period of the additional time that is needed to complete the transfer to the auxiliary bucket as measured by the timing means.

6. A combination weighing apparatus comprising weighing buckets adapted to weight masses of material, auxiliary buckets for temporarily storing masses transferred from the weighing buckets, combination processing means for selecting a combination of the weighing and auxiliary buckets to form a batch of material of a predetermined weight, control means for sending discharge signals to the selected buckets to discharge their contents, and means for restricting which auxiliary buckets may be used in combinations to those auxiliary buckets to which the transfer of material from a weighing bucket will be completed before a discharge signal would be received by the auxiliary bucket thereby excluding from selection such auxiliary buckets which would have remaining mass in their corresponding weighing buckets, which remaining mass would be transferred to such auxiliary buckets after completion of the selection by the combination processing means.

7. The combination weighing apparatus according to claim 6 wherein the restricting means includes flags for identifying which auxiliary buckets may be used in combinations, and means for setting the flags.

8. The combination weighing apparatus according to claim 7 wherein the means for setting the flags includes detecting means for detecting when a transfer from a weighing bucket to the auxiliary bucket begins;

timing means, responsive to the detecting means, for measuring the additional time that is needed to complete the transfer to the auxiliary bucket;

comparing means for comparing the additional time that is needed to complete the transfer to the auxiliary bucket with the amount of time required by the combination processing means to select a combination of the weighing and auxiliary buckets to form a batch of material of a predetermined weight; and setting means, responsive to the comparing means, for setting a flag for the auxiliary bucket if the time required by the combination processing means is greater than or equal to additional time needed to complete the transfer.

9. A method of controlling a combination weighing apparatus to reduce the time of operation, the combination weighing apparatus being of the type comprising weighting buckets adapted to weight masses of material, auxiliary buckets for temporarily storing masses of material transferred from the weighing buckets, combination processing means for selecting a combination of the weighing and auxiliary buckets to form a batch of material of a predetermined weight, and control means for opening the selected weighing and auxiliary buckets to discharge their contents, the method comprising the steps of:

determining the amount of time remaining until the completion of the transfer of a mass of material to each of the auxiliary buckets from the weighing buckets; and holding each auxiliary bucket open a period of time corresponding to the sum of the time required to discharge the contents of the auxiliary bucket plus the amount of time indicated by the determining means as remaining until completion of the transfer of the mass of material to the particular auxiliary bucket;

so that if the auxiliary bucket is opened while a mass of material is being transferred to it from a weighing bucket, the auxiliary bucket remains open until the transfer and discharge are complete.

10. The method according to claim 9 wherein the determining step includes the steps of detecting when a transfer from a weighing bucket to the auxiliary bucket begins; and when the transfer begins, monitoring the additional time that is needed to complete the transfer to the auxiliary bucket.

11. A method of controlling a combination weighing apparatus to reduce its time of operation, the combination weighing apparatus comprising weighing buckets adapted to weigh masses of material, auxiliary buckets for temporarily storing masses transferred from the weighing buckets, combination processing means for selecting a combination of the weighing and auxiliary buckets to form a batch of material of a predetermined weight, and control means for sending discharge signals to the selected buckets to discharge their contents, the method comprising restricting which auxiliary buckets may be used in combinations to those auxiliary buckets to which the transfer of material from a weighing bucket will be completed before a discharge signal would be received by the auxiliary bucket thereby excluding from selection such auxiliary buckets which would have remaining mass in their corresponding weighing buckets, which remaining mass would be transferred to such auxiliary buckets after completion of the combination processing means.

12. The method according to claim 11 wherein the restricting step includes the steps of:

determining the amount of time remaining until the completion of the transfer of a mass of material to each of the auxiliary buckets from the weighing buckets;

comparing the additional time that is needed to complete the transfer to the auxiliary bucket with the amount of time required by the combination processing means to select a combination of the weighing and auxiliary buckets to form a batch of material of a predetermined weight; and identifying, based on the comparison, the auxiliary buckets for which the transfer will be complete before the combination processing means selects a combination.

* * * * *